US012720098B1

(12) United States Patent
Racz

(10) Patent No.: US 12,720,098 B1
(45) Date of Patent: Aug. 25, 2026

(54) METHODS AND SYSTEMS FOR IDENTIFYING VIOLATION VIDEOS

(71) Applicant: GENETEC INC., St-Laurent (CA)

(72) Inventor: Pierre Racz, Montreal (CA)

( * ) Notice: Subject to any disclaimer, the term of this patent is extended or adjusted under 35 U.S.C. 154(b) by 887 days.

(21) Appl. No.: 17/083,772

(22) Filed: Oct. 29, 2020

Related U.S. Application Data

(60) Provisional application No. 62/927,320, filed on Oct. 29, 2019.

(51) Int. Cl.
*H04N 19/467* (2014.01)
*G06T 1/00* (2006.01)
*G06V 20/52* (2022.01)
*G06F 21/31* (2013.01)

(52) U.S. Cl.
CPC ......... *H04N 19/467* (2014.11); *G06T 1/0085* (2013.01); *G06V 20/52* (2022.01); *G06F 21/31* (2013.01); *G06T 1/0057* (2013.01)

(58) Field of Classification Search
CPC ..... H04N 19/467; G06V 20/52; G06T 1/0085
See application file for complete search history.

(56) References Cited

U.S. PATENT DOCUMENTS 6,674,858 B1 * 1/2004 Kimura .............. H04N 21/4334 713/193
6,763,121 B1 * 7/2004 Shaked ................... G06T 1/005 382/237
6,782,116 B1 * 8/2004 Zhao .................... G07D 7/0032 713/176
6,807,285 B1 * 10/2004 Iwamura ............ H04N 1/32352 726/32
7,222,235 B1 * 5/2007 Mitsui ..................... G06T 1/005 380/54

(Continued)

OTHER PUBLICATIONS

Milano, Dominic. "Content control: Digital watermarking and fingerprinting." White Paper, Rhozet, a business unit of Harmonic Inc., http://www. rhozet. com/whitepapers/Fingerprinting-Watermarking. pdf, Last accessed May 30 2012. https://www.digimarc.com/docs/default-source/technology-resources/white-papers/rhozet_wp_fingerprinting_watermarking.pdf.

*Primary Examiner* — Peter D Le
(74) *Attorney, Agent, or Firm* — Anglehart et al.

(57) ABSTRACT

A method of identifying a user associated with a violation video may include the following steps: retrieving a source video; applying one or more watermarks to the source video, wherein the one or more watermarks encode viewing information related to the source video; displaying the source video and the one or more watermarks to the user; retrieving the violation video; identifying a region of interest in the violation video; identifying a section of the source video which corresponds to the violation video; registering the region of interest with a corresponding region in the source video; determining a transfer function relating pixels in the region of interest of the violation video to pixels in the corresponding region of the source video; determining expected values of the pixels in the region of interest of the violation video; comparing the expected values of the pixels in the region of interest to actual values of the pixels in the region of interest; identifying features of one or more of the one or more watermarks; and recovering the viewing information from the identified features of the one or more watermarks.

18 Claims, 10 Drawing Sheets

(56) References Cited

U.S. PATENT DOCUMENTS 8,848,969 B2 9/2014 Ramsdell et al.
9,009,482 B2 4/2015 Winograd
9,330,429 B2 5/2016 Barnes et al.
9,633,228 B1 * 4/2017 Maimon ............... G06F 21/645
9,883,255 B2 1/2018 Perry
10,007,964 B1 * 6/2018 Calhoon ................... G06T 3/40
10,354,354 B2 7/2019 Zhao et al.
10,757,292 B1 * 8/2020 Sung ..................... G06T 1/0021
10,834,457 B1 * 11/2020 Bourgoyne ........ H04N 21/4318
10,853,456 B1 * 12/2020 Crawforth ............ H04L 9/0643
11,308,572 B1 * 4/2022 Benkual .................. G06T 1/005
2001/0000265 A1 * 4/2001 Schreiber ................ G06F 21/84 726/30
2001/0020270 A1 * 9/2001 Yeung ................... G06T 1/0042 713/176
2001/0021978 A1 * 9/2001 Okayasu ............ H04N 1/32144 713/176
2001/0026616 A1 * 10/2001 Tanaka ................. H04N 19/467 382/250
2001/0032186 A1 * 10/2001 Iwamura ................ G06Q 30/06 705/54
2002/0006212 A1 * 1/2002 Rhoads .............. H04N 1/32288 704/E19.009
2002/0009208 A1 * 1/2002 Alattar ................. G06K 7/1417 707/E17.112
2002/0015508 A1 * 2/2002 Hannigan ............ H04N 1/3216 382/199
2002/0016916 A1 * 2/2002 Natarajan .......... H04N 1/32283 713/179
2002/0021805 A1 * 2/2002 Schumann ............. H04N 7/163 705/51
2002/0039479 A1 * 4/2002 Watanabe .......... H04N 1/00127 386/230
2002/0049614 A1 * 4/2002 Rice ....................... G16H 40/67 705/3
2002/0057823 A1 * 5/2002 Sharma ................ H04N 1/3224 382/100
2002/0061122 A1 * 5/2002 Fujihara ................ G06T 1/0021 382/100
2002/0097891 A1 * 7/2002 Hinishi ................. G06T 1/0071 382/100
2002/0126870 A1 * 9/2002 Wendt ................ H04N 1/32149 382/100
2002/0129252 A1 * 9/2002 Nishitani .............. G06T 1/0028 713/176
2002/0166050 A1 * 11/2002 Takahashi ............. G06T 1/0071 713/176
2003/0037075 A1 * 2/2003 Hannigan ................ G09B 5/06 715/201
2003/0053653 A1 * 3/2003 Rhoads .................. H04N 7/163 707/E17.112
2003/0190054 A1 10/2003 Troyansky et al.
2003/0191941 A1 * 10/2003 Terada ............... H04N 1/32325 713/176
2003/0210803 A1 * 11/2003 Kaneda .............. H04N 1/32203 382/232
2003/0223614 A1 * 12/2003 Robins ............... H04N 1/32144 382/100
2004/0008866 A1 * 1/2004 Rhoads .................. G06F 16/58 382/100
2004/0010670 A1 * 1/2004 Pelly ...................... H04N 5/913 711/164
2004/0039914 A1 * 2/2004 Barr ...................... G06T 1/0071 713/176
2004/0071311 A1 * 4/2004 Choi ..................... G06T 1/0071 382/100
2004/0145661 A1 * 7/2004 Murakami ......... H04N 1/32144 348/222.1
2004/0184065 A1 * 9/2004 Guan .................... G06T 1/0021 358/1.14
2004/0194126 A1 * 9/2004 Kogure .............. H04N 21/4408 725/31
2004/0208339 A1 * 10/2004 Abe ...................... G06T 1/0028 382/240
2004/0236716 A1 * 11/2004 Carro .................... G06F 40/163
2004/0264732 A1 * 12/2004 Tian ..................... H04N 1/3217 382/240
2005/0002543 A1 * 1/2005 Cornog ................... G06T 1/005 382/100
2005/0031160 A1 * 2/2005 Shaked ................... G06T 1/005 382/100
2005/0111723 A1 * 5/2005 Hannigan .............. G07D 7/162 713/176
2005/0180567 A1 * 8/2005 Williams ............... H04N 7/163 380/201
2006/0031684 A1 * 2/2006 Sharma ................ G06K 9/0053 340/5.52
2006/0062073 A1 * 3/2006 Kitani .............. G11B 20/00094 365/232
2006/0080178 A1 * 4/2006 Lee .................... G06Q 30/0601 705/26.1
2006/0110005 A1 * 5/2006 Tapson .................. G06T 1/0028 382/100
2006/0133477 A1 * 6/2006 Zhang ................ H04N 21/4405 375/240.18
2006/0198549 A1 * 9/2006 Van Vugt ................ G06T 1/005 382/103
2006/0279763 A1 * 12/2006 Tamura .............. H04N 1/32138 358/1.14
2006/0279817 A1 * 12/2006 Iida .......................... G03H 1/22 359/2
2007/0003102 A1 * 1/2007 Fujii ..................... G06T 1/0071 348/E7.024
2007/0030515 A1 * 2/2007 Adachi ............... G06F 21/6209 358/1.15
2007/0030996 A1 * 2/2007 Winger ................. G06T 1/0085 375/E7.199
2007/0147656 A1 * 6/2007 Browning ........... G06F 21/6227 707/E17.02
2008/0089552 A1 * 4/2008 Nakamura ........... H04N 21/835 375/E7.009
2009/0089585 A1 * 4/2009 Kogure .............. H04N 1/32149 713/176
2009/0185683 A1 * 7/2009 Russell ................. G06T 1/0085 380/210
2010/0223477 A1 * 9/2010 Onoda ............. G11B 20/00492 713/189
2011/0064262 A1 * 3/2011 Chen .................... H04N 19/597 348/E13.001
2011/0170737 A1 * 7/2011 Lin ......................... G06T 1/005 382/100
2011/0188700 A1 * 8/2011 Kim ....................... H04N 5/913 382/100
2013/0028465 A1 * 1/2013 Kuraki .................. G06T 1/0085 382/100
2013/0120651 A1 * 5/2013 Perry ................. H04N 21/8358 348/441
2014/0098360 A1 * 4/2014 Kwon ...................... G07D 7/10 356/51
2014/0133694 A1 * 5/2014 Mishra ............... H04N 1/00416 382/100
2014/0292817 A1 * 10/2014 Iversen ................ H04N 13/363 345/672
2016/0050468 A1 2/2016 Morten et al.
2016/0088047 A1 * 3/2016 Mou ....................... H04L 67/02 709/219
2016/0360294 A1 12/2016 Perry
2016/0364826 A1 * 12/2016 Wang ................. H04N 1/32288
2017/0041328 A1 * 2/2017 Stack .................... G06F 21/645
2017/0200122 A1 * 7/2017 Edson ................... H04L 63/104
2017/0353624 A1 * 12/2017 Dixit ...................... H04N 1/442
2018/0295172 A1 10/2018 Vikramaratne
2021/0256651 A1 * 8/2021 Smith ...................... H04N 1/64
2022/0067216 A1 * 3/2022 Bokade ................... G06F 21/62

* cited by examiner

METHODS AND SYSTEMS FOR IDENTIFYING VIOLATION VIDEOS

This application claims priority of U.S. provisional patent application 62/927,320 filed Oct. 29, 2019, the contents of which are incorporated herein by reference.

TECHNICAL FIELD

The present disclosure relates to video identification and specifically to video identification through the use of watermarks.

BACKGROUND

Security videos are captured at private and public locations to record activity, including security violations. These videos are often monitored in real-time, or near real-time by security personnel in order to identify security violations as they occur and/or while the perpetrators are still at the location. Such monitoring may be necessary to provide adequate security.

Monitoring of security videos by security personnel also represents a potential security risk, as personnel may record and distribute such videos illicitly. In particular, security personnel may make and share recordings of noteworthy events captured by security footage. Noteworthy events may capture criminal activity, involve famous persons, or show dramatic events. Videos capturing these events may be short, for example only a few seconds in length. They may also be low-quality, as they may be made by recording the screen of a security monitoring device using a smartphone or other camera.

The venues which capture security footage may suffer negative consequences from security footage being distributed illicitly. In some jurisdictions, distribution of some security footage may be illegal. In other cases, it may result in negative publicity and/or loss of public trust. Venues may wish to avoid these consequences by identifying induvial perpetrators who record and distribute their footage. Therefore, it is necessary to be able to identify an individual who recorded a recovered video, which may be short and/or low-quality.

SUMMARY

The present disclosure relates to methods and systems which may be used to identify viewing information about a recovered video. The viewing information may be encoded into a source video using one or more watermarks. Methods disclosed herein may recover the encoded information from a copy of the source video, even if the copy is short or low-quality.

In one aspect, the present disclosure relates to a method of identifying viewing information associated with a violation video including retrieving a source video, applying one or more watermarks to the source video, wherein the one or more watermarks encode viewing information related to the source video, displaying the source video and the one or more watermarks to the user, retrieving the violation video, identifying features of one or more of the one or more watermarks, and recovering the viewing information from the identified features of the one or more watermarks. In some embodiments, the retrieving a source video may comprise authenticating, at a security system video archive server, a user or a user's computer to receive the source video, the viewing information having a correlation with said user or said user's computer.

In one aspect, the present disclosure relates to a method of identifying a user associated with a violation video. The method may include the following steps: retrieving a source video; applying one or more watermarks to the source video, wherein the one or more watermarks encode viewing information related to the source video; displaying the source video and the one or more watermarks to the user; retrieving the violation video; identifying a region of interest in the violation video; identifying a section of the source video which corresponds to the violation video; registering the region of interest with a corresponding region in the source video; determining a transfer function relating pixels in the region of interest of the violation video to pixels in the corresponding region of the source video; determining expected values of the pixels in the region of interest of the violation video; comparing the expected values of the pixels in the region of interest to actual values of the pixels in the region of interest; identifying features of one or more of the one or more watermarks; and recovering the viewing information from the identified features of the one or more watermarks.

In another aspect, the present disclosure relates to a method of extracting information from a violation video. The method may include the following steps: obtaining a violation video and a source video which corresponds to the violation video; identifying a region of interest in the violation video; registering the region of interest with a corresponding region in the source video; determining a transfer function relating pixels in the region of interest of the violation video to pixels in the corresponding region of the source video; determining expected values of the pixels in the region of interest of the violation video; and comparing the expected values of the pixels in the region of interest to actual values of the pixels in the region of interest.

In another aspect, the present disclosure relates to a method of identifying a user associated with a violation video. The method may include the following steps: streaming a source video to a monitoring device; applying one or more watermarks to the source video at the monitoring device, wherein the one or more watermarks identify viewing information related to the source video; displaying the source video and the one or more watermarks to the user on the monitoring device; retrieving the violation video, wherein the violation video is a copy of the source video and the one or more watermarks; identifying a section of the source video which corresponds to the violation video; identifying a region of interest in the violation video; registering the region of interest with a corresponding region in the source video; determining a transfer function relating pixels in the region of interest of the violation video to pixels in the corresponding region of the source video; determining expected values of the pixels in the region of interest of the violation video; comparing the expected values of the pixels in the region of interest to actual values of the pixels in the region of interest; identifying features of one or more of the one or more watermarks; and identifying the user based on the identified features of the one or more watermarks.

DETAILED DESCRIPTION

In general, the present disclosure relates to methods for identifying a violation video made by copying a source video and systems configured to perform such methods. The source video may be a video retrieved from a security camera or a similar device. The violation video may be a low- or high-quality copy of the source video made by an authorized user who monitors the source video. One or more watermarks may be applied to the source video before it is displayed, such that the violation video includes both the source video and the watermark. Methods of the present disclosure generally include comparing the violation video to the source video to identify features of the watermarks. The features of the watermarks may be used to identify the authorized user responsible for the violation video.

Figure 1:
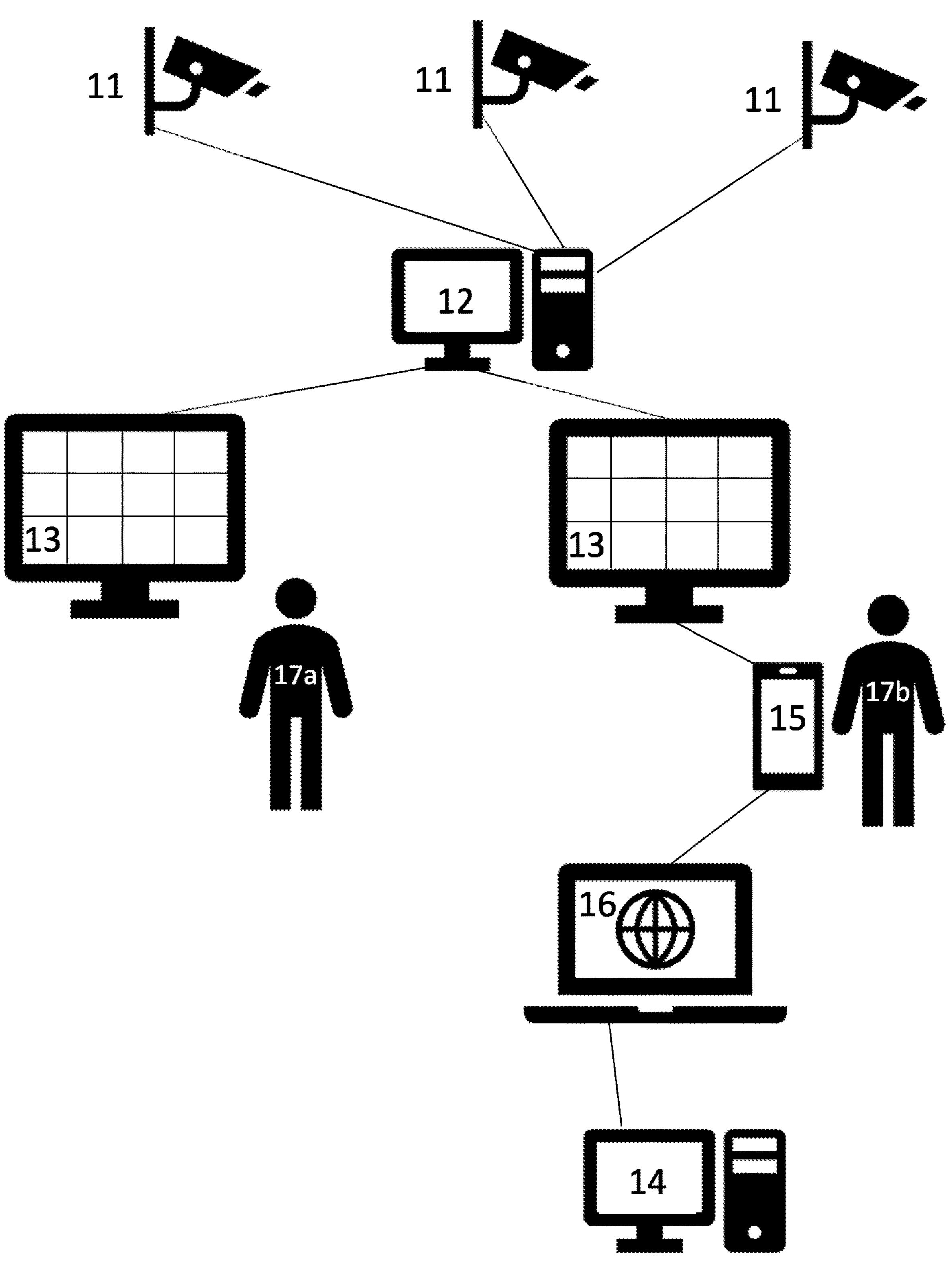
FIG. 1 is a schematic diagram of a hardware system in accordance with the present disclosure.

FIG. 1 shows a schematic diagram of a system which may be used to perform the method outlined above and detailed below. One or more security cameras 11 or other security monitoring devices may capture video footage and transmit the video footage to an archive server 12. This footage may comprise a source video. The archive server 12 may process the video footage and transmit it to one or more security monitoring devices 13. In some embodiments, processing the video footage may comprise applying watermark(s) to the video footage. The watermark(s) may encode viewing information about the source video. The security monitoring devices 13 may display footage from one security camera 11 or more than one security cameras 11. Authorized users 17*a*, 17*b* may monitor the footage displayed on the security monitoring devices 13. In some embodiments, the authorized users 17*a*, 17*b* may sign-in to the security monitoring devices 13, such that it is known which authorized user 17*a*, 17*b* is responsible for which security monitoring device 13 at what time.

An authorized user 17*b* may make a recording of the footage displayed by a security monitoring device 13 using a recording device 15 or recording software. The recording may be considered a violation video. The authorized user 17*b* may post the recording to a video sharing website 16 and the recording may be recovered from there. The recovered recording may be analyzed using a managing/processing computer 14. Analyzing the video may comprise identifying the watermark applied to the source video from which the recording was made. The watermark may provide viewing information related to the source video which may be used to identify the authorized user 17*b* responsible for the recording.

The present disclosure will first describe exemplary methods of identifying a violation video, with reference to FIGS. 2A-2E. Hardware and software systems which may perform such methods will then be described with reference to FIGS. 3A-3C. Exemplary watermarks will then be detailed with reference to FIGS. 4A-4B.

FIGS. 2A-2E are flowcharts illustrating exemplary methods in accordance with the present disclosure. Like steps are referred to with like reference numbers. In some cases, some figures will show only a main step, which will be assigned a reference number, e.g. 112, while other figures will show sub-steps, which will be assigned additional reference letters, e.g. 112*a*. In some cases, figures will show alternative, similar steps, which will be indicated with a prime sign, e.g. 113 and 113'.

One skilled in the art will recognize that methods may include a subset of the steps in an exemplary method, a combination of steps in different exemplary methods, and/or steps not recited in any exemplary method without going beyond the scope of the present disclosure.

Methods in accordance with the present disclosure may comprise four general parts: display of a processed source video (101-103), production of a violation video (104), retrieval of the violation video (105), and identification of the violation video (106-114). A goal of the methods may be to recover identifying information about a violation video.

The source video may be retrieved from a monitoring device such as a security camera (101). The retrieval may be performed using any means known in the art. For example, the source video may be transferred from a security camera to a server over a wired or wireless connection. The retrieval may be performed in real time or near real time. In some embodiments, the source video may comprise video retrieved from multiple monitoring devices.

Figure 2A:
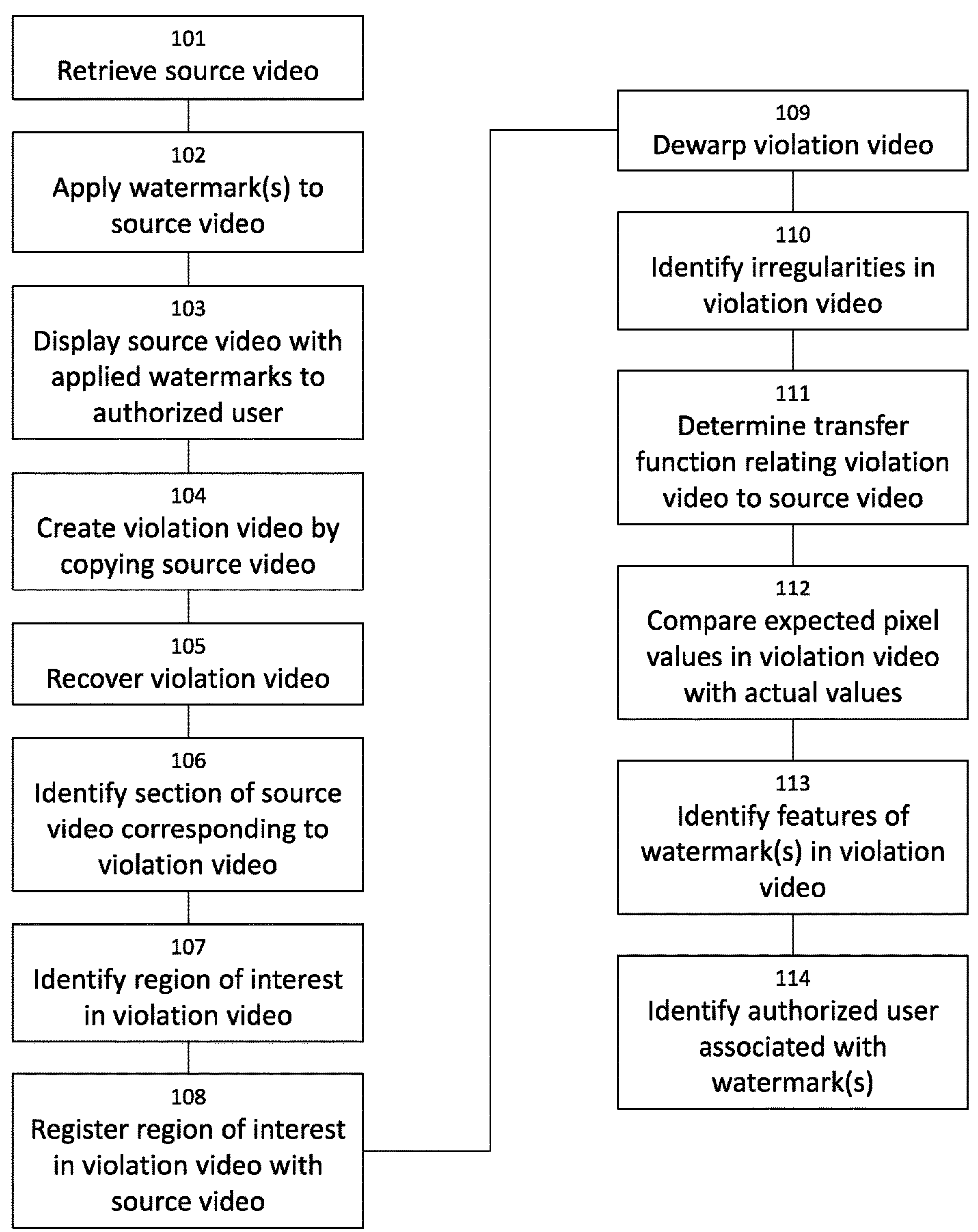
FIGS. 2A-2E are flowcharts illustrating methods of identifying a violation video in accordance with the present disclosure.

One or more watermarks may be applied to the source video (102). As shown in FIG. 2A, the watermarks may be applied by an archive server. Methods for applying watermarks to videos are well known in the art. The source video without the watermark may be maintained on the archive server or on other storage media. The watermarks may include identifying information about how the source video is displayed. Such information may include: a time at which the source video is viewed, a workstation on which the source video is viewed, an authorized user who views the source video, and/or other information regarding the conditions under which the source video is viewed. The identifying information may be included directly in the watermark or it may be encoded via a text-based or pictographic code and the code may be included in the watermark. In some embodiments, the watermarks may be undetectable or uneditable. Examples of such watermarks will be discussed in more detail below, with respect to FIGS. 4A-4B. In general, an undetectable watermark may not be noticeable or intelligible to someone who views the source video with the applied watermark; a viewer who made an unauthorized copy would not be aware that the copy included an undetectable watermark. An uneditable watermark may be difficult or impossible to remove from a copy of the source video with the watermark applied.

As discussed above, watermarks may include information identifying an authorized user to whom the source video is displayed. In such embodiments, an authorized user may login to a display system prior to the application of the watermarks. Once the authorized user is logged in, a watermark identifying the authorized user may be generated and applied to the source video. The source video with the applied video may then be displayed to the user as described below. In some embodiments, multiple authorized users may view the source video. Different watermarks associated with each authorized user may be generated and applied to the source video prior to its display to each of the authorized users.

Figure 2B:
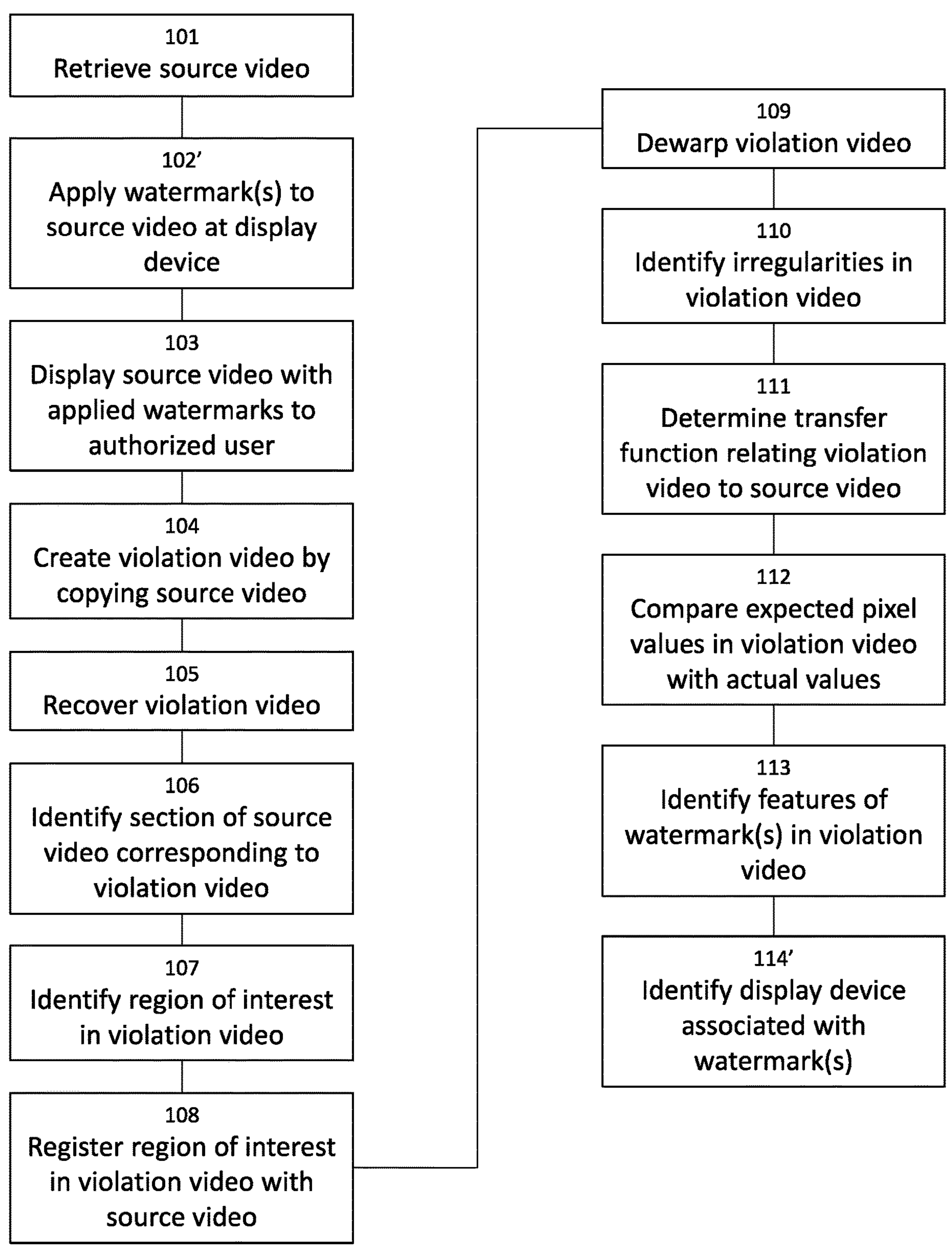

FIG. 2B shows an embodiment in which the watermark(s) are applied to the source video at a workstation or other display device (102'). In such embodiments, the watermark(s) may uniquely identify the workstation or display device on which the source video and watermark(s) are displayed. They may also encode other information, such as a time at which the video was displayed. This information may be encoded into the watermark(s) and/or directly displayed in the watermark(s). Authorized users may be required log in to the workstation or display device. Therefore, information about the workstation on which the video was displayed may be sufficient to identify an authorized user who viewed the video.

The source video with the applied watermark or watermarks may be displayed to an authorized user (103). In general, the present method may be used with systems and methods in which the source video is only made available to authorized users. Such systems and methods may require unique logins to be used, such that a particular authorized user is associated with each instance in which the source video is displayed. In an exemplary embodiment, the source video and the applied watermarks may be displayed at a workstation; an authorized user may sign into the workstation to view the source video. In an alternative embodiment, the source video and the applied watermarks may be displayed on a video-capable device, such as a smartphone; the authorized user may sign-in to a secure online system to view the source video. As discussed above, one or more of the watermarks applied to the source video may be associated specifically with the authorized user who is logged into the workstation. Other watermarks may include information about the workstation or the time at which the video is viewed, which could be used to further identify the authorized user. The video viewed by the authorized user may comprise the combination of the source video and the one or more watermarks and may uniquely identify the authorized user. The watermarks may or may not be readily apparent during their display and the authorized user may or may not be aware of the presence of the watermarks.

The authorized user may create a violation video by making a copy of the source video and the applied watermarks (104). The violation video may be created by any means known in the art. For example, the authorized user may record a screen of the workstation displaying the source video and the applied watermarks using a smartphone, video camera, or other device. Alternatively, the authorized user may use screen capture software to make the recording. In some cases, the violation video may be made by a third party, rather than by the authorized user; however, as the source video may only be displayed using an authorized user's credentials, a violation video made by a third party may be associated with the authorized user whose credentials were used.

A violation video is made by recording the source video with one or more watermarks applied. The violation video may or may not be a high-quality copy. If the violation video is a high-quality copy, it may be readily apparent that it will include a quality reproduction of the source video and the one or more watermarks. However, the violation video may necessarily include identifying features of at least one watermark even if the violation video is a low-quality video. Examples of low-quality violation videos include violation videos in which only a portion of the displayed video is visible, videos with a low frame rate, videos in which the displayed video is captured at an extreme angle, and videos with other technical issues. Identifying features of at least one watermark may also necessarily be captured in very short violation videos. As discussed above, the watermarks may be designed such that they are included on all areas or nearly all areas of the displayed video in every frame or nearly every frame. Therefore, if a violation video captures only a portion of the displayed video or captures the displayed video at a low frame rate, the captured portion will include at least some features of one or more of the watermarks.

The features described above may make this method particularly versatile. Many violation videos are recorded from security footage are low-quality, short in length, or both. Violation videos may be captured only to post and/or disseminate a particular event of interest, which may only last seconds. Furthermore, they may be captured using ad hoc recording equipment under haphazard conditions. For example, an authorized user may quickly record from a display device screen by making a video with their smartphone as soon as they realize that the source video includes an event which may be widely interesting. Such a recording is likely to show only a portion of the display screen, to have coloration issues, to include movement of the camera, or to otherwise be low-quality. The low-quality and short videos described here are generally the most difficult to identify. Therefore, the violation video identification process described below has particular utility.

The violation video may be recovered (105). The recovery may be performed through any means. For example, if the violation video is posted online, it may be recovered from a video sharing website. In some cases, the recovered violation video may be a gif or other short-form video.

The recovered violation video may be analyzed to identify features of the watermarks applied to the source video from which it was copied. The analysis is outlined in steps 106-114 of FIGS. 2A-2E. The analysis may use the violation video, the source video without watermarks applied, and a database of watermarks which were applied to the source video prior to its display.

A section of the source video which corresponds to the violation video may be identified (106). This section may comprise a series of frames in the source video. As discussed above, the source video may comprise video footage recorded by a video camera or other security device. The source video may cover a long period of time, for example, several hours or more. As discussed above, the violation video may be much shorter, for example, several seconds to several minutes long. Therefore, only a portion of the source video may correspond to the violation video. Identification of the section corresponding to the violation video may be performed manually or by a computer program. While an operator viewing the violation video might be able to ascertain the time and source camera from which the violation video was taken, computer programs which can match videos in this manner are well known in the art. The source video may be trimmed to only include the frames which correspond to the violation video; the source video referred to in subsequent steps may mean the trimmed source video or the full-length source video.

A region of interest in the violation video may be identified (107). The region of interest may include the portion of the violation video which shows the source video and the watermark. The identification of the region of interest can be done using an operator by identifying the boundary of a window within the violation video that appears to be of interest. For example, if the violation video includes the display device showing the source video and some background area, the region of interest may be the area of the violation video which shows a screen of the display device. In some cases, the area of the violation video which comprises the region of interest may change from frame to frame. For example, if the violation video was made by recording a display device screen with a smartphone camera and the smartphone was moved during the recording, the display device screen may occupy different areas of the violation video in different frames. Identification of the region of interest may be performed manually or by a computer program. Computer programs which can identify regions of videos in this manner are also known in the art. The violation video may be cropped to only include the pixels in each frame which correspond to the region of interest; the violation video referred to in subsequent steps may mean the cropped violation video or the unprocessed violation video.

The violation video may be registered with the source video (108). The trimmed source video and the cropped violation video may be used for the registration. Methods of registering two videos showing the same or similar material are well known. The registration may be performed using any methods known in the art. The registration process may use multiple frames from the violation video, and in some cases, may use all or nearly all of the frames in the violation video. In some embodiments, registration may include dewarping the violation video (109). In general, the violation video may be of lower quality (pixel density, frame rate, etc.) than the source video. The violation video may also be oriented at an irregular angle and/or have a shifting orientation. The registration process may account for these shortcomings in the violation video and may include correcting irregular orientations of frames in the violation video.

The registration process may compensate for shortcomings in the violation video, allowing details to be recovered from the violation video which could not otherwise be recovered. Accordingly, methods according to the present disclosure may be able to identify watermark(s) in violation videos of lower quality and/or shorter length than other methods for identifying watermark(s) in videos.

Irregularities in the violation video may be identified (110). Irregularities may include glare, shadows, or foreign objects, such as a thumb of the person who filmed the violation video. As discussed above, violation videos may be filmed quickly and in haphazard conditions; therefore, they may be likely to include irregularities. If irregularities are present in the region of interest (see step 108), they may be difficult or impossible to remove. In some embodiments, these irregularities may not be corrected, but may rather be flagged in the software used to process the violation video. The flagging may be performed through any means known in the art. In some embodiments, particularly when an irregularity is present for only a single frame or a small number of frames, predictive software may be used to replace the irregularities predicted pixel values. Predicted pixel values may be determined based on the frames before and after the irregularity is present. They may represent the most likely pixel values that would have represented the pixels which were obscured by the irregularities. Predictive software is well known; predictions may be performed through any means known in the art.

Figure 2C:
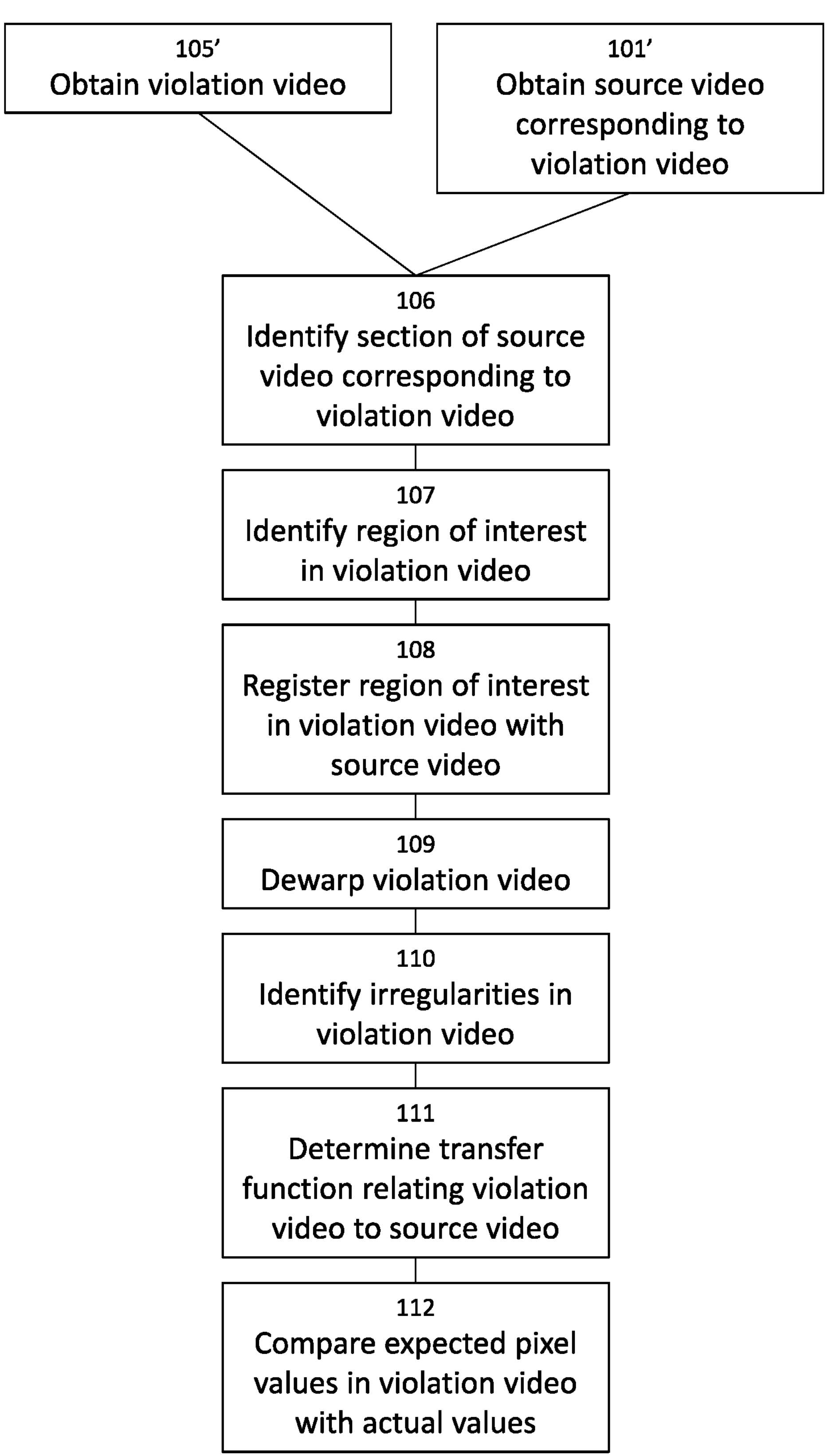
Figure 2D:
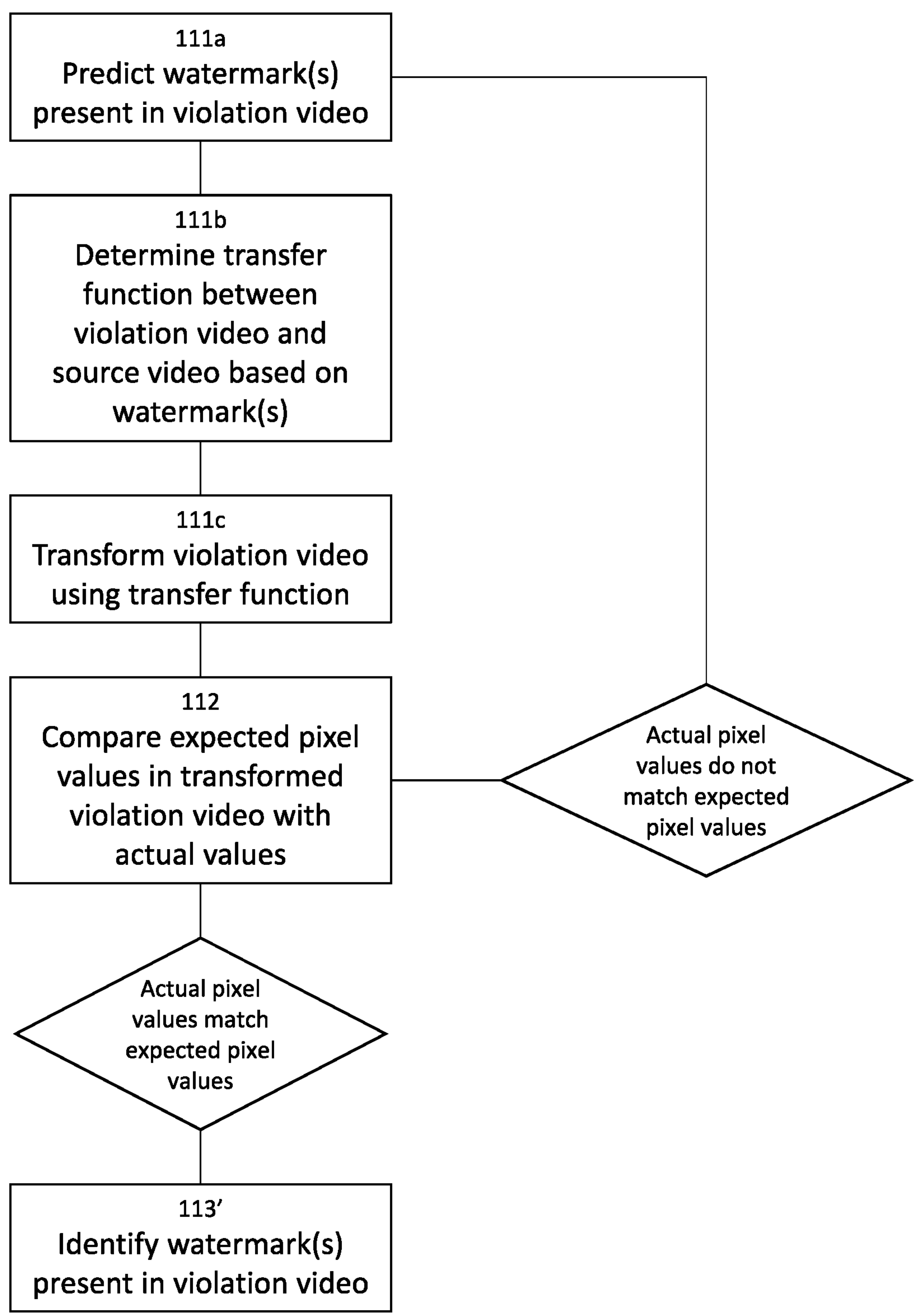
Figure 2E:
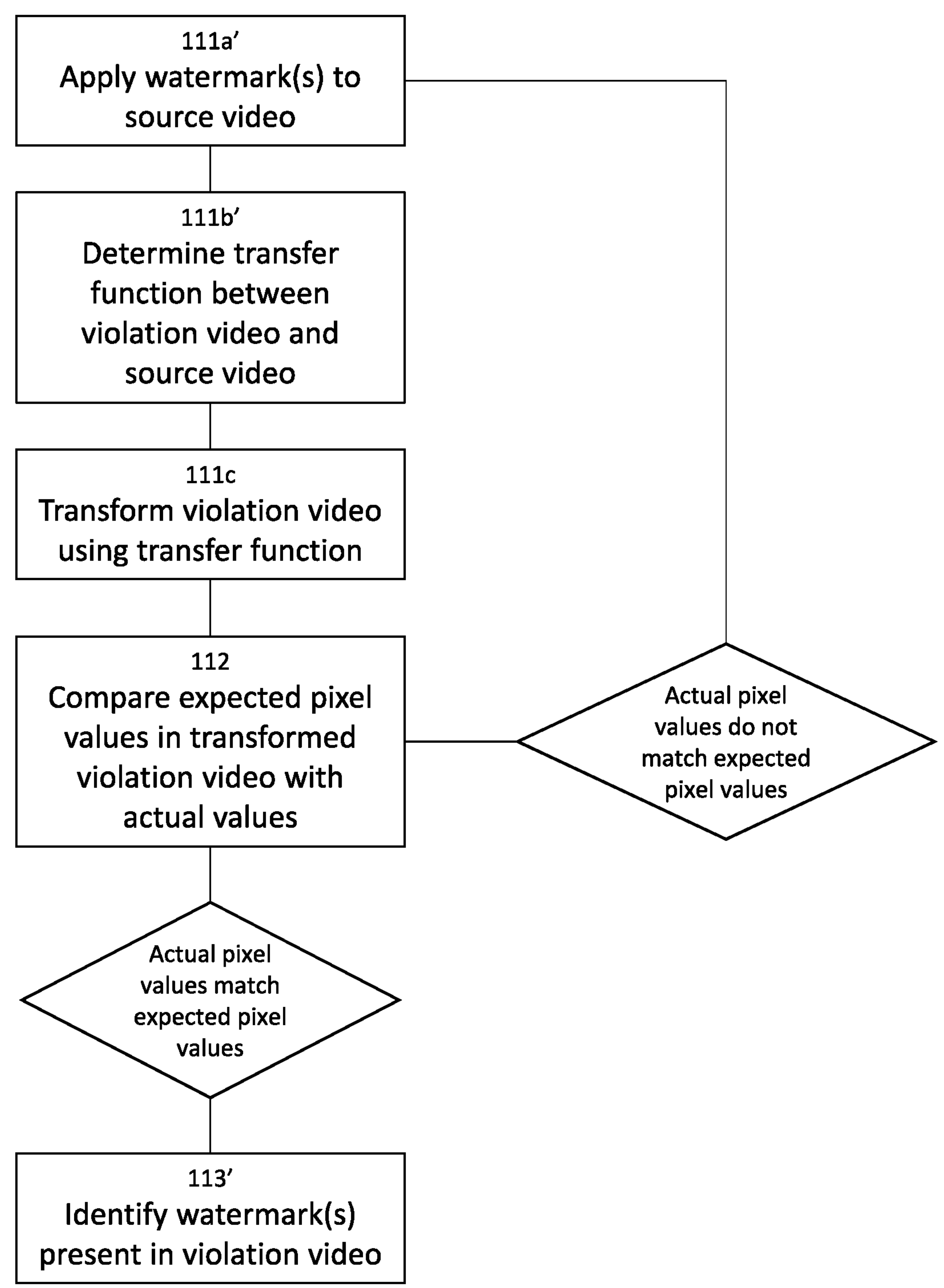

A transfer function relating the pixels of the violation video to the pixels of the source video may be determined (111). The transfer function may be used to compare expected pixel values of the violation video to actual pixel values of the violation video (112). Features of the watermark(s) may be identified based on this comparison (113). FIGS. 2D-2E show details of two exemplary methods for performing steps 111-113.

As discussed above, processing methods according to the present disclosure may make use of the violation video, the source video, and a database of watermarks which were applied to the source video before it was displayed. The method shown in FIG. 2D predicts which watermark(s) are present in the violation video and determines a transfer function based on that prediction. This method can be applied in any situation, but it may be particularly advantageous when the database of watermarks applied to the source video includes a relatively large number of watermarks.

The watermark(s) present in the violation video may be predicted (111*a*). Predicting the watermark(s) may comprise selecting watermark(s) from the database of watermarks applied to the source video. In some embodiments, it may be known how many watermarks and/or what types of watermarks were applied to the source video when it was displayed. For example, it may be known that a first watermark encoding the time at which the video was viewed and a second watermark encoding a workstation on which the video was viewed were applied to the source video. This information may be used when making predictions. In some embodiments, one or more of the watermarks in the violation video may be visible or partially visible. A fully visible watermark may be identified with certainty; a partially visible watermark may inform the prediction. In some embodiments, one or more of the watermarks in the violation video may not be visible to the human eye. These watermark(s) may be predicted at random.

A transfer function between the violation video and the source video may be determined based on the predicted watermark(s) (111*b*). The transfer function may or may not account for other differences between the violation video and the source video, such as pixel density and frame rate. Pixels in the violation video which were flagged in the previous step (110) and corresponding pixels in the source video may or may not be excluded from the determination of a transfer function. The transfer function may be determined using multiple frames of the violation video and source video. In some embodiments, all or nearly all of the frames in the videos may be used. Using more frames of the videos may allow a more accurate transfer function to be determined. Methods of determining a transfer functions may be well known in the art and one skilled in the art may be able to apply knowledge of transfer functions to this particular situation. Accordingly, the transfer function may be determined using any means known in the art.

The transfer function may be applied to the violation video (111*c*). Application of the transfer function may transform the pixels of the violation video such that they take on new values, yielding a transformed violation video.

The actual values of the pixels in the violation video may be compared to the expected values of the pixels in the violation video (112). The comparison may be performed manually or using a computer program. If the predicted watermark(s) are the watermark(s) applied to the violation video, the actual values will match the expected values. Differences in quality between the violation video and the source video and irregularities present in the violation video may prevent the values from matching perfectly. Accordingly, a filter may be used eliminate differences caused by video differences, or a threshold above zero may be set for video matching. Degradation of the watermark(s) in the violation video may also cause the match to be less than perfect.

The steps above (111*a*-112) may be iterated if the actual values of the pixels in the violation video do not match the expected values. In iterations, the watermark(s) predicted in step 111*a* may be informed by the previously predicted watermarks.

In some embodiments, the steps (111*a*-112) may be performed for all possible combinations of watermarks. For example, if the watermark(s) are heavily degraded or the violation video is of very low quality, it may be impossible to identify any transformed violation videos created in step 111*c* as a match to the actual violation video. Instead, the transformed violation video which matches the actual violation video most closely may be identified.

If the actual values of the pixels in the violation video and the expected values do match, the watermark(s) on which the transfer function was based may be identified as the watermark(s) in the violation video (113').

The method shown in FIG. 2E applies watermark(s) from the database to the violation video and determines a transfer function based on the applied watermark(s). This method can be applied in any situation, but it may be particularly advantageous when the database of watermarks applied to the source video includes a relatively small number of watermarks and when it is known that only one or two watermarks were applied to the source video each time it was displayed.

One or more watermarks from the database may be applied to the source video to create a transformed source video (111*a'*). The watermark(s) may be chosen based on a prediction of which watermark(s) are present in the violation video. In some embodiments, it may be known how many watermarks and/or what types of watermarks were applied to the source video when it was displayed. For example, it may be known that a first watermark encoding the time at which the video was viewed and a second watermark encoding a workstation on which the video was viewed were applied to the source video. This information may be used when making predictions. In some embodiments, one or more of the watermarks in the violation video may be visible or partially visible. A fully visible watermark may be identified with certainty; a partially visible watermark may inform the prediction. In some embodiments, one or more of the watermarks in the violation video may not be visible to the human eye. These watermark(s) may be predicted at random.

A transfer function between the violation video and the transformed source video may be determined (111*b'*). Methods of determining a transfer functions may be well known in the art and one skilled in the art may be able to apply knowledge of transfer functions to this particular situation. Accordingly, the transfer function may be determined using any means known in the art.

Steps 111*c*, 112, and 113' may be performed as described above with respect to FIG. 2E. The potential iteration of steps 111*a*-112 may also be performed as described above. As discussed above, step 113/step 113' identifies one or more watermark(s) and/or features of one or more watermark(s) which are present in the violation video.

After completion of steps 111-113, according to FIG. 2D, FIG. 2E, or some combination thereof, an authorized user associated with the watermark(s) in the violation video may be identified (114). If the watermark(s) are encoded, they may first be decoded. Decoding the watermark(s) may provide viewing information about how the source video was viewed when the violation video was made. If the watermark(s) are not encoded, this information will be available directly. Depending on what viewing information the watermark(s) contain, the information may be analysed to identify the authorized user. For example, the watermark(s) may contain information about when and where the source video was displayed. Such information could be analysed against employee logs and login information to identify an associated authorized user. In some embodiments, the authorized user may be identified directly by the watermark(s), rendering such analysis unnecessary.

Methods according to the present disclosure may not include all of the steps illustrated in FIGS. 2A-2B. For example, FIG. 2C illustrates an exemplary truncated method. The source video and the violation video are obtained through any means known in the art (101', 105'). The videos are then processed following steps 106-112 described above. The comparison between the transformed violation video and the actual violation video is output. This method may be used when the video analysis is performed by a separate party than the initial video security monitoring and display. In some embodiments, the violation video, the source video, and the database of applied watermarks may be provided to the party performing the video analysis by the party performing the video security monitoring.

Figure 3A:
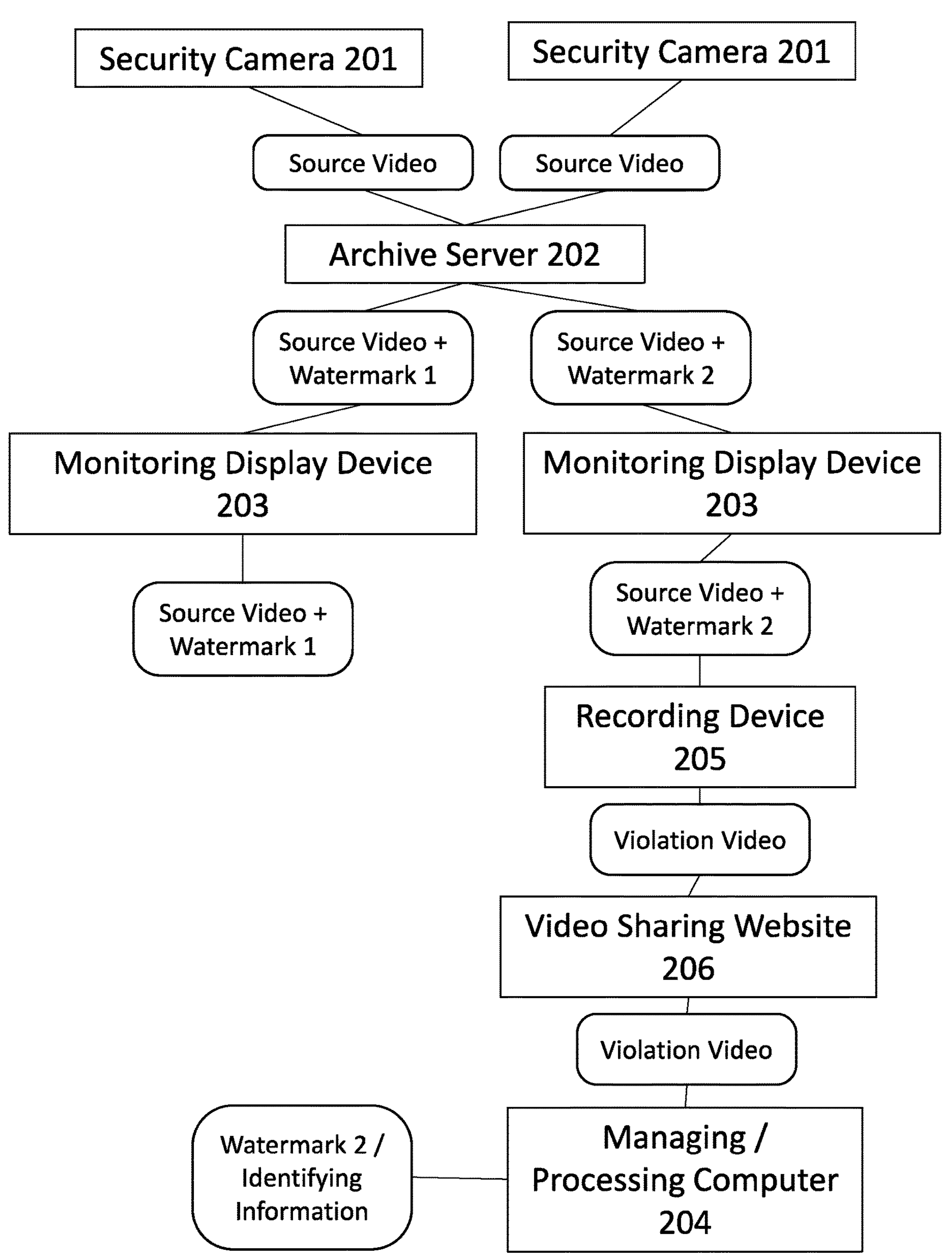
FIGS. 3A-3C are schematic diagrams of hardware systems which may be used to perform methods in accordance with the present disclosure.
Figure 3B:
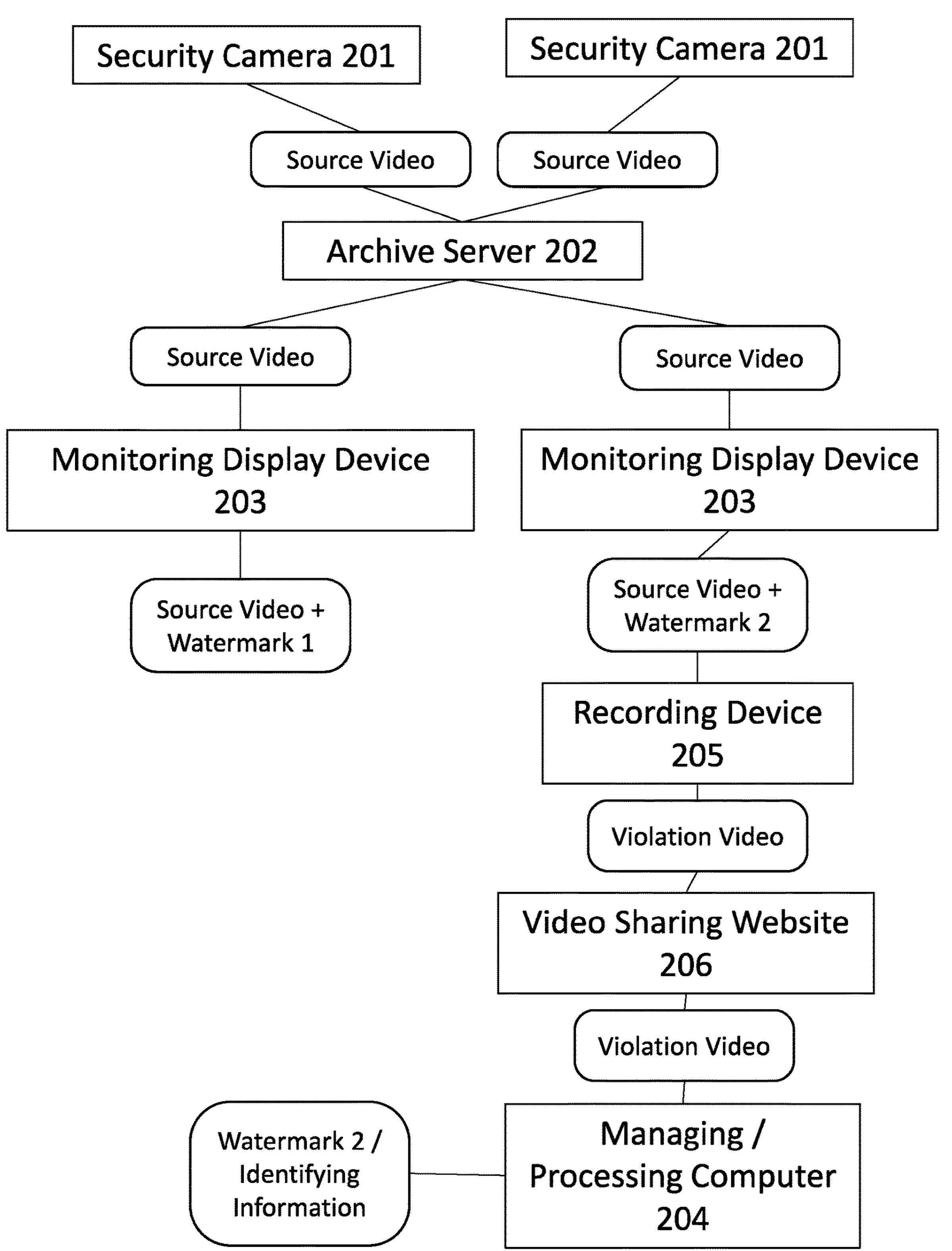
Figure 3C:
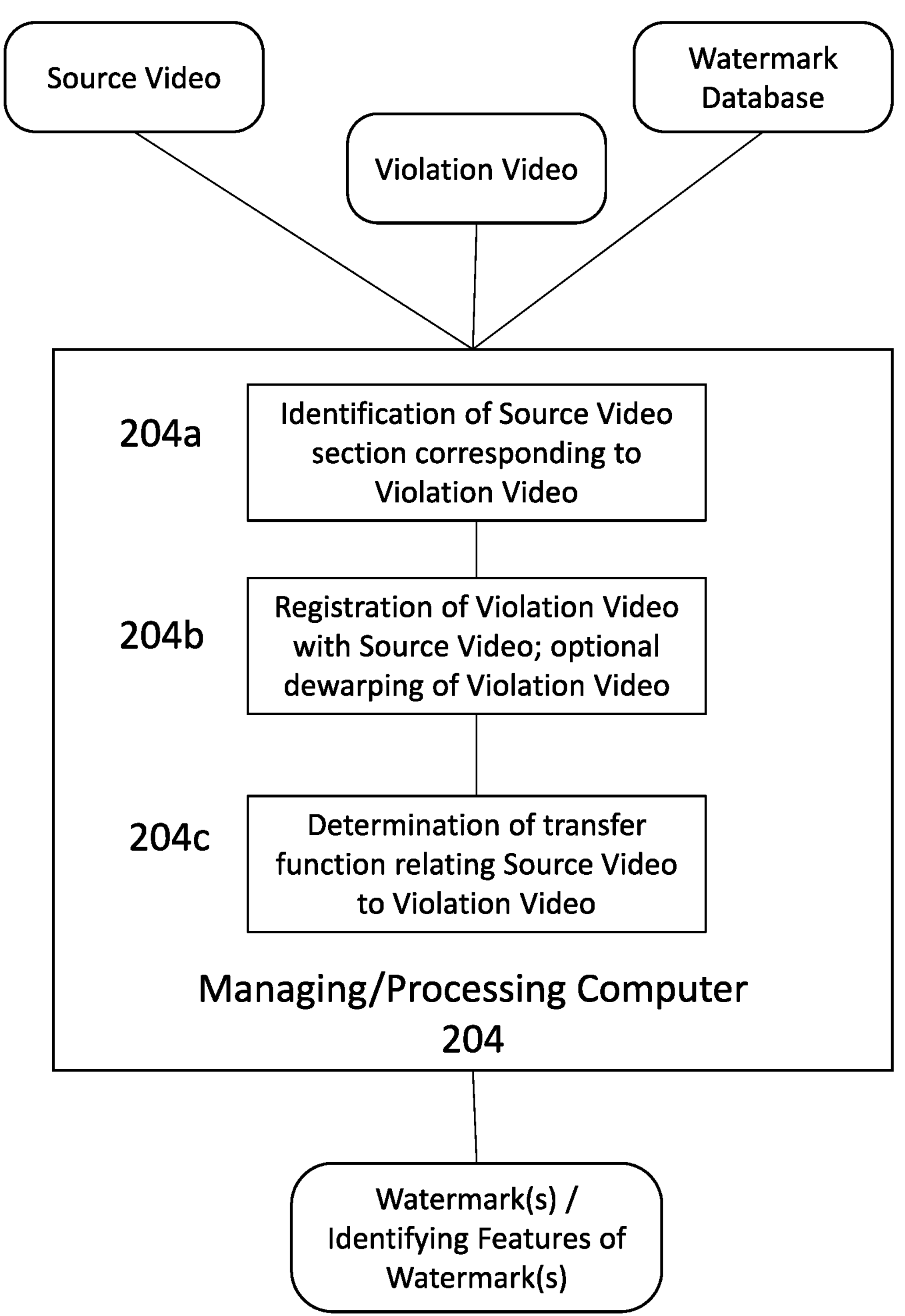

FIGS. 3A-3C illustrate hardware and software systems which may perform the methods described above. Like components are referred to with like reference signs. In some cases, some figures will show only a main component, which will be assigned a reference number, e.g. 212, while other figures will show subcomponents, which will be assigned additional reference letters, e.g. 212*a*.

Systems according to the present disclosure may generally include one or more security devices 201, an archive server 202, one or more monitoring display devices 203, and a managing/processing computer 204. Completion of the steps described above may also make use of a recording device 205 and a video sharing site 206. FIGS. 3A-3B illustrate the movement of videos between these components.

One or more security devices 201 may capture video footage, or source videos. The security devices 201 may be security cameras and may capture footage of public or private locations at which regular monitoring is desired to prevent theft, prevent other crimes, or for any reason. The security devices 201 may transfer the source videos 201 to an archive server 202. The archive server 202 may be any type or server known in the art. As shown in FIG. 3A, the archive server 202 may apply one or more watermarks to the source videos, as described above with respect to FIGS. 2A-2E. The archive server 202 may transfer the source video and watermarks to one or more monitoring display devices 203. The video transferred to different monitoring display devices 203 may include different watermarks. Alternatively, as shown in FIG. 3B, the archive server 202 may not apply watermarks to the source videos before transferring them to the video monitoring devices 203. The monitoring display devices 203 may each apply one or more watermarks to the source videos before displaying them. Different monitoring display devices 203 may apply different watermarks. The transfers between the security devices 201, the archive server 202, and the video monitoring devices 203 may be made by any means known in the art and may be made over wired or wireless connections.

Authorized users may view the source videos with the watermarks at the video monitoring devices 203. An authorized user may use a recording device 205 to make a recording of the source video and the applied watermarks. This recording may be considered a violation video. The violation video may be posted to a video sharing site 206, where it may be recovered.

The recovered violation video may be analyzed using a managing/processing computer 204, which may run software modules detailed in FIG. 3C. The managing/processing computer 204 may recover the watermarks included in the violation video and/or the identifying information encoded by the watermarks.

FIG. 3C shows details of the managing/processing computer 204. The managing/processing computer 204 may receive a violation video, a source video, and a database of watermarks applied to the source video as inputs. It may output watermarks and/or identifying features of watermarks present in the violation video.

The managing/processing computer 204 may include at least three software modules. A first module 204*a* may identify a section of the source video which corresponds to the violation video. A second module 204*b* may register the violation video with the source video. The second module 204*b* may also dewarp the violation video. A third module 204*c* may determine a transfer function between the source video and the violation video. The third module 204*c* may also apply the transfer function to the violation video. In some embodiments, the managing/processing computer 204 and its constituent software modules 204*a*-204*c* may perform any of steps 106-114 described above with respect to FIGS. 2A-2E.

As discussed above, a variety of watermarks may be used in accordance with methods disclosed herein. The watermarks may directly display viewing information about a source video or encode the viewing information. Direct display of viewing information may simply comprise text which recites the time at which the source video was viewed or the workstation at which it was viewed. Encoding viewing information may comprise using a pictographic or textual code to transform the viewing information into different text, an image, or a design. The transformed text, image, or design may be used as a watermark.

Standard watermarks which display static, moving, or changing text or images over a video are well known in the art. Methods disclosed herein may use such watermarks; they may also use undetectable and/or uneditable watermarks. In general, watermarks used in the present methods may be unobtrusive, such that they do not obscure the source videos over which they are displayed.

Undetectable watermarks may comprise watermarks which cannot be seen by the unaided human eye; they may be created via steganography. In some embodiments, codes may be hidden in stream headers and other signaling; however, such codes would likely will only survive direct data reproduction and would not be recoverable from a violation video made by recording a source video with an external recording device. Therefore, such codes may be used in conjunction with other watermarks. Undetectable watermarks may also comprise watermarks hidden within the source video. Watermarks may be hidden by frequency, for example in flashes occurring at speeds not detectable by human eye, but slower than the framerate of a typical camera and playback system. The frequency at which the flashes occur may be chosen such that the watermark will be visible in a violation video having a duration of several seconds or less and recorded at a low frame rate. Watermarks may be hidden by location and orientation if they are placed in spatial frequencies invisible to the human eye, for example at diagonal high frequency. Watermarks may be hidden by size if they are made small enough to not be noticed, but large enough to be picked up by a recording device. Watermarks may be hidden by spoofing, or by making them appear to be something else. For example, a regular-looking timestamp inset may be modified to comprise distortions encoding the viewing information. Although the timestamp is not undetectable, the fact that it encodes viewing information is not readily apparent. Other methods of making text or images undetectable in videos are known in the art and may be employed in conjunction with the methods disclosed herein.

Undetectable watermarks may not be effective as a deterrent to copying a source video; therefore, they may be used in conjunction with visible watermarks. The visible watermark could be compared to the undetectable watermark to determine if the visible watermark was altered in a violation video made from the source video.

Uneditable watermarks may comprise watermarks which cannot be removed from a violation video. Cropping is one of the simplest ways to edit a video to remove a watermark. Combating cropping may involve attempting to overlay anything interesting in the video with the watermark. The watermark should be transparent enough the video beneath it to be readily seen. In some embodiments, the location of interesting subject matter may be known and the watermark could be placed in that location. If the location is not known, object detection or tracking could be used to place the watermark over detected objects or in regions where movement is detected. Cropping may also be combatted by applying a watermark over the entire video. For example, repeating text or images may be repeated across the entire screen to make a wallpaper-like effect whereby it is easier to ignore. The level of transparency, color, or other characteristics of the watermark may be altered over the image (particularly over repeated test or images) or over time to make it harder to subtract it automatically.

Uneditable watermarks may comprise watermarks that take up the whole frame or significant portions thereof. For example, luminance, color, intensity of any one color subpixel, or similar features may be modified over the whole frame or large parts thereof. These modifications may be made in patterns which encode the viewing information. The patterns may be spatial, or they may flash in time. The patterns may be chosen so that they are either undetectable or unobtrusive to a human viewer and so that they will be picked up by a recording device with a slow frame rate and/or a low pixel density. The watermark may be modulated over time by amplitude modulation, for example using amplitude shift keying, or frequency modulation (for example, by using quadrature amplitude modulation—QAM—or quadrature phase-shift keying—QPSK). In some embodiments, such watermarks may be both uneditable and steganographic.

Including several different types of watermarks may also make the watermarks difficult to edit. Watermarks may be static or moving. They may change size, position, color, or shape over time. They may include variations in luminance, shade, or other features discussed above. In some embodiments, one type of watermark may be used to encode a first piece of viewing information while a second type of watermark may be used to encode a second piece of viewing information. The presence of two or more types of watermarks in the video may make both of the watermarks more difficult to remove.

Figure 4A:
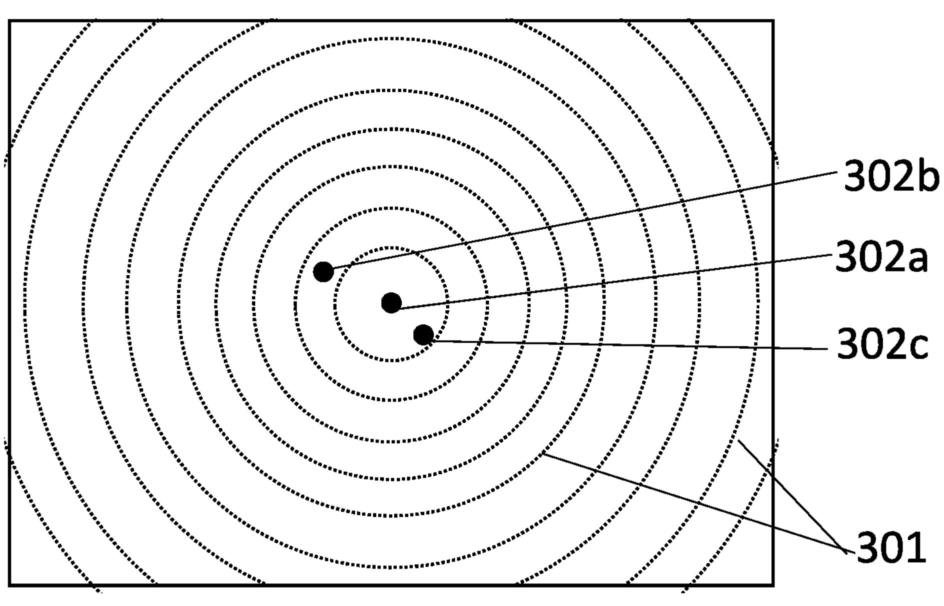
FIGS. 4A-4B are schematic diagrams of watermarks which may be applied to source videos in accordance with the present disclosure.
Figure 4B:
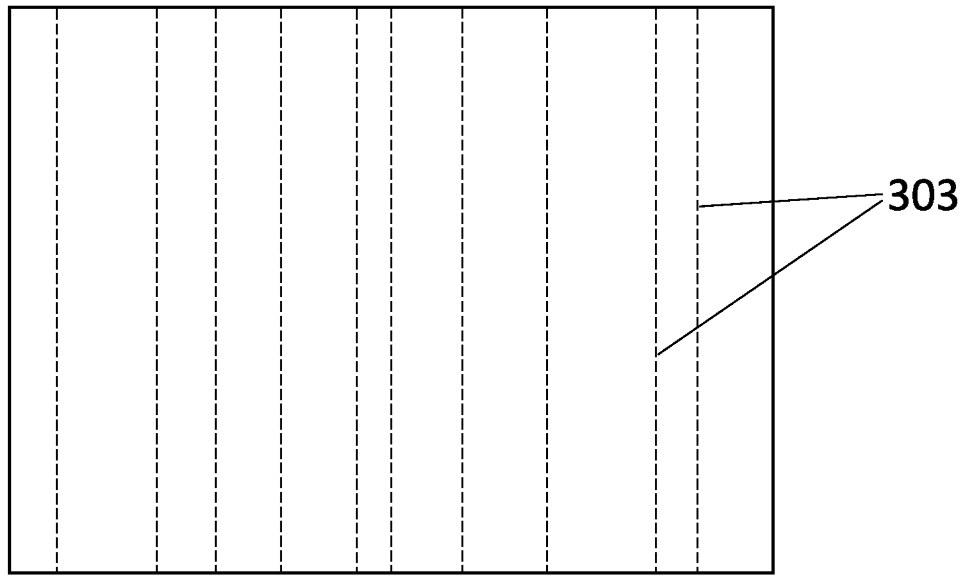

FIGS. 4A-4B illustrate exemplary uneditable watermarks. FIG. 4A shows a watermark comprising multiple concentric circles 301. The circles 301 may be overlaid a source video as a semi-transparent watermark. Alternatively, shifts in color or luminance in the source video may be modulated along the circles 301. Software may be used to merge the circles with the source video, such that they are not visually obtrusive. The concentric circles 301 may encode viewing information about the source video based on their center. As illustrated in FIG. 4A, the circles 301 are centered at point 302*a*. Point 302*a* may be assigned to a particular authorized user or workstation. Other points 302*b*, 302*c* may be assigned to other authorized users or workstations. Decoding the watermark may comprise detecting portions of one or more circles, in other words arcs, and using the arcs to find a center point of the circles 301. Similar watermarks could be achieved with any polygon or curved shape.

FIG. 4B shows a watermark comprising spatial color variation. Changes to the color of the source video may be applied along the dashed lines 303. In some embodiments, the lines 303 may be modified to be curved, jagged, or otherwise variant. In some embodiments, horizontal or diagonal lines may be used in addition to or instead of the vertical lines shown. The location of the lines or the changes in color applied along the lines may be used to encode the viewing information. Depending on the color variation scheme used in a watermark as shown in FIG. 4B, the watermark may be undetectable or nearly undetectable as well as uneditable. In some embodiments, the watermark may be clearly detectable.

One skilled in the art will be able to envision a variety of watermarks based on these examples. Any such watermarks are within the scope of the present disclosure. They may be used separately or in combination to encode viewing information about the source videos to which they are applied. The watermarks may be designed such that they are uneditable and/or undetectable and such that they will be captured by recording devices with slow frame rates and/or low pixel densities.

As described, a watermarked video may be compared with a source video in order to identify a modification made to the source video in the watermarked video and to recover the watermark information which may identify a particular access to the source video. In certain embodiments, rather requiring access to the source video for this purpose, a hybrid watermarked video may be created which is divided into a source or calibration portion and a watermarked portion such that retrieving a watermarked code can be done based on the resulting video alone using the watermarked portion and the calibration portion. For example, as described a watermarked may be embedded in the form of a modification of the source video such as applying a change in luminance, chrominance(s) or particular color (RGB) value. Such change can vary in time or space to encode a code into the watermarked video. Now in order to recover the code, we may refer back to the source/unwatermarked video and compute a difference or transfer function. However in the case of hybrid watermarked video, certain portions of the watermarked video comprise the watermark while others may not. Referring to the source video may be done using the unwatermarked portion of the hybrid watermarked video.

In one example, the images of a hybrid watermarked video are divided into a pattern of regions each comprising a number of pixels. In one such example, each frame is divided into a checkerboard of rectangles having X by Y pixels (for some X and Y). In this example the same division into regions applies to all frames although the pattern could alternatively vary in time. Now the regions are divided into watermarked and unwatermarked regions. For example, the odd rectangles (e.g. the ones that would be black in a typical checkerboard) may contain the watermark while the even rectangles (the ones that would be white) comprise unwatermarked image data. In order to compare the watermarked video to source video, the watermarked regions are compared to the unwatermarked regions. Alternatively (or supplementally), the hybrid watermarked video may be divided over time with watermarked and unwatermarked portions varying over time. For example, the video may alternate between sets of watermarked and unwatermarked frames. The number of frames may be chosen to increase the odds that a recording device recording a monitor playing the video would discretely capture each portion in at least one frames. A code can be provided over a several portions of the video such that recovering the watermarking in those several portions enables one to reconstitute the code. For example, different regions of a frame may comprise different portions of the code. In temporal watermarking, this may mean that a portion of the video comprising a number of watermarked frame comprises a portion of the code, and that subsequent watermarked subsets of frames comprise the rest of the code. The size of the subsets of frames may be selected such that the portions of code change at a rate allowing a recording device to capture each discrete portion of the watermark in at least one frame. A skilled person will appreciate that a slow enough alternation may allow recording devices to capture at least one full frame of each portion while a fast enough alternation may minimize visual impact on the watcher and may even hide the watermark entirely from casual observation.

To recover the code encoded into a hybrid watermarked video, watermarked portions of the video are compared to other, e.g. unwatermarked, portions. Comparing can be done in any suitable way. The technique used may compensate for the fact that comparison is done between portions of the video representing different portions of the original video. For example, a background model may be used to extract a background image from the video and the comparison may be applied only to portions of the video in the background. This may be particularly useful in the case of watermarked and unwatermarked portions alternating in time as the background is expected to remain substantially the same. However even in the case of space-alternating watermarked/unwatermarked regions, the background image may be useful as there may be more correlation between content of the different regions in the background than the foreground. Moreover, where there is redundance, portions may be analyzed and selected for comparison or discounted based on their visual content. Similar regions may be selected for comparison and very different (e.g. high frequency content vs low frequency content) may be discarded.

Over a suitably selected set of portions to compare to one another, analyses such as the ones described herein may be used to estimate the modification brought to watermarked regions over source regions. Statistical analyses may be used to account for differences in underlying video in the different portions to compare. In a simple example, the average value of the parameter modified by watermarking (e.g. luminance) may be taken across (a) watermarked region(s) and compared to (a) corresponding (e.g. neighboring) unwatermarked region(s). The difference in average (e.g.) luminance may be used to estimate a modification amount. In a simple example where the regions are arranges in a checkerboard pattern as described above, the difference between average (e.g.) luminance in a watermarked region is compared to the same value for four adjacent unwatermarked region and the smallest difference is taken as the value of the change applied to the source video. Again, portions of the image that are not background may be discounted from this analysis if desired.

The watermarked portions may comprise identical watermarking (e.g. the same modification applied to those portions) or a code may be distributed across multiple portions with the watermarking being applied differently across those multiple portions to represent the code, e.g. using the methods described herein. Now, in order to increase the accuracy of estimated recovery methods, redundance may be introduced into the watermarking and watermark recovery schemes. For example, the watermark may be repeated over several portions of the video. In one example the watermark is applied in a checkerboard pattern across the frames of a video with every odd (or even) checkerboard rectangle having the same modification applied to it, and the remaining rectangles remaining unwatermarked. The change applied to the watermarked rectangles may change over time to encode a code. This redundancy provides robustness to detectability of the watermark in two way. First if only a portion of the watermarked video is recovered due to cropping or incomplete capture, the watermarked portion is likely to still be recovered given that it is redundantly spread across a substantial portion of the video, in this case frames. Second, the accuracy of the computed/estimated modification applied to the watermark area can be increased by the bigger sample size of data available. Statistical analyses on the regions may be applied to derive more accurate results. For example, an estimated measure of the modification in each region may be found and aberrant regions may be discarded from consideration. The remaining regions may be weighed according to factors indicative of significance. For example, if luminance is modified by the watermark, the regions in the mid-range of luminance may be given more weight. Although in this example all the regions have the same watermark applied to them, it will be appreciated that redundance can be achieved even with codes provided over multiple regions if the multi-region code is repeated in the image. Redundance may also be provided in temporal watermarking. Preferably the code is quickly transmitted and repeated redundantly in time such that any clip of the watermarked video that is leaked would likely comprise the whole code.

When a video is leaked, it may be modified by video editing or simply as a consequence of the way it was captured (e.g. filmed off a screen). As such, it may not be possible to always know in advance exactly where in the watermarked portions are located (in space, but also in time) in the watermarked video. As such, pilot artefacts may be inserted to guide the detection of watermarked regions. Pilot artefacts may be visible artefacts deliberately introduced in a place and/or time in a video to serve as a guide for decoding a watermark. They may be, for example, a dot made up of a single or a group of pixels with a known unlikely value, such as 100% red, 0% green, 0% blue. These may be inserted in the watermarked video at a known location and/or time relative to watermarked portion to facilitate identifying the watermarked portions. The checkerboard example, a red dot may be inserted in the center of every watermarked region. Although one or more red dot may be obscured by being located on a red object in the video, in all likelihood at most will not be. The odds of such obscuring can be further reduced by making the pilot artefact multi-featured, e.g. multicolored, e.g. adding a green dot right next to the red. Even if a leaked video is cropped or modified, a number of pilot artefact will be visible if the leaked video contains any significant portion of the original. The pilot artefact not only provide information on the location of the watermarked regions, but their relative distance to one another provides scaling information and their alignment provides orientation information such that the location of unwatermarked regions will also be derivable, as the skilled person will appreciate. Pilot artefact can also identify unwatermarked portions or interface between the watermarked and unwatermarked portions. Pilot artefact may also identify watermarked portions in time. For example, pilot dot(s) as described may be provided only on frames that contain the watermark so as to make them identifiable later. They may be repeated across the frame to make sure that even a cropped video will contain the pilot artefacts. Pilot artefact may also convey additional information. For example, they may indicate the start or end of a code. Since a watermark will typically be distributed over plural regions in order to comprise the whole code, it may be useful to provide a special pilot artefact to identify where the code begins, for example. Alternatively, special watermarking may indicate the start or end of the code, such as with a higher degree of modification or a different type of modification than is used elsewhere in the code. It should be noted that pilot artefact may be used with any watermarked video, not just hybrid watermarked video.

As described, hybrid watermarked video may comprise both watermarked and unwatermarked portions. In essence, the information encoded by watermark may be recovered by observing the difference between watermarked and unwatermarked portions. This may also be accomplished by using differential watermarking. In such a case, different portions of the video may be modified differently relative to one another such that observing the difference between the two portions provides information. As with the regular watermarking, in any hybrid watermarking, differentially watermarked or not, more than one bit of encoding may be provided per area, e.g. a scale of degree of difference (e.g. difference in luminance) or types of difference (e.g. difference in different characteristics, such as difference in luminance vs chrominance) may represent a value in a range greater than 1-or-0.

A method of providing a video with code identifying an access to the video may include the step of:

- Identifying an access to an original video.
- Obtaining (e.g. generating) a unique or semi-unique code designating the access to the original video.
- Generating a watermarked video by applying a modification to certain portions of the image, the modifications being representative of the code.
  - More particularly, this may be a hybrid watermarking encoded by providing different portions of the video different watermarking relative to one another such that the difference in encoding between portions represents a portion of the code.
    - The hybrid watermarked video may comprise one or more portion of unwatermarked source video and one or more portion of watermarked video. The difference in encoding being entirely defined by the watermarking of the watermarked portion(s).
    - The hybrid watermarked video may me differentially watermarked.
  - The watermarked portions may be spatial regions distributed spatially across the frames of the watermarked video.
    - The spatial distribution may be in a checkerboard pattern of rectangles.
      - e.g. where the odd or even rectangles are watermarked and the other ones aren't.
    - The spatial distribution may include redundant repetition of the watermark.
    - The spatial distribution may be spread out to cover substantially an entire frame of the video.
    - The spatial distribution may include a set of regions each comprising in their watermarking a different portion of the code.

- The watermarked portions may be temporally distributed across multiple frames of the watermarked video.
  - The watermarking may be a modification applied to substantially entire frame(s) of a subset of consecutive frames of the video.
    - The watermarking may be encoded in a series of different subsets each encoding a portion of the code.
- Generating the watermarked video may comprise applying pilot artefacts.
  - The pilot artefacts may indicate the location in space or time of the watermarked portions.
    - The pilot artefacts may be distributed spatially across the frame in a pattern representative of a pattern of watermarked regions.
      - The pilot artefacts may indicate alignment and relative positioning of watermarked regions.
  - The pilot artefacts may provide an indication of the start or end of the code.
  - The pilot artefacts may be dots of pixels having a particular color and intensity.

Transmitting the watermarked video for the requested access.

- The code may be stored in memory.
  - It may be stored alongside additional information on the access, such as user and time of access.
- The original video may be retained unmodified in storage.

A method of analysing a watermarked video to derive therefrom a code identifying an access associated with the watermarked video may include the steps of:

Obtaining a watermarked video.

Identifying watermarked portions of the video.

- This may include identifying watermarked spatial regions in one or more frames of the video.
- This may include identifying watermarked subsets of frames in the video.
- This may include identifying one or more pilot artefacts in the video.
  - This may include identifying a plurality of pilot artefacts distributed spatially across at least one frame of the video and deriving from the spatial distribution of pilot artefacts the spatial distribution of watermarked regions in the at least one frame.
  - This may include identifying a plurality of pilot artefacts distributed temporally across multiple subsets of frames of the video and deriving from the temporal distribution of pilot artefacts the temporal distribution of watermarked portions of the video.
  - This may include identifying a pilot artefact indicative of the start of the code and deriving therefrom the temporal distribution of watermarked portions of the video.
- This may include identifying unwatermarked portions of the video.

Comparing at least one watermarked portion of the video with at least one other portion of the video and deriving therefrom at least a portion of the code.

- The at least one other portion may be an unwatermarked portion. It may alternatively be a differentially watermarked portion.
- The comparing may comprise estimating a modification made to the watermarked portion from an original video.
  - This may comprise a statistical analysis of the difference between the portions.
    - It may in fact comprise a statistical analysis of several portions compared to several other portions.
  - This may comprise a step of selecting portions to use for the comparison. For example, if too great or small a difference is found, or if the luminosity is too high or low, those portions may be discarded.
- This may comprise using a background model of the video and applying the analysis only on background portions of the video.
- Comparison may be applied to several portions of the video to derive several portions of code and may further comprise assembling the code from the several portions of code.

Analyzing the code to identify the access associated with the watermarked video.

- This may include retrieving additional information on the access, such as user and time of access, from storage using the code.
  - This may involve communicating the code to a server, such as the server that watermarked the video, as part of a request for the additional information.

Advantages of the present disclosure have been discussed throughout. In particular, the present disclosure allows watermarks to be recovered from short and/or low-quality violation videos made by copying source videos. Accordingly, the methods disclosed herein may be used to recover watermarks from videos which otherwise could not be processed, such as very short or very low-quality videos. Such videos represent a significant portion of violation videos made from security footage. Therefore, the present disclosure provides a significant advantage for identifying and preventing illicit copying and distribution of security footage and similar video recordings.

What is claimed is:

1. A method of identifying a source of leaked security footage encoded in viewing information associated with a violation video captured at a secure and uniquely identified security system monitoring workstation, the method comprising:

collecting and storing video streams from a network of security cameras, each observing a location for security purposes, at a security system video archive server, authenticating, at said security system video archive server, a user or a user's security system monitoring workstation to receive a source video from said security system video archive server, said source video being a security recording of said location and being captured by at least one of said security cameras, said viewing information having a correlation with said user or said user's security system monitoring workstation, said security system monitoring workstation allowing an authenticated user to view security videos from any one of said network of security cameras;

applying one or more watermarks to the source video, wherein the one or more watermarks encode viewing information related to the source video and to said authenticated user or user's security system monitoring workstation, said one or more watermarks comprising watermarked portions present on spatial regions distributed spatially across the source video;

displaying a displayed video comprising the source video and the one or more watermarks to the user;

retrieving the violation video, said violation video being a recording of the displayed video at the security system monitoring workstation;

identifying features of one or more of the one or more watermarks in the violation video; and recovering the viewing information from the identified features of the one or more watermarks;

wherein said identifying said features comprises:

identifying a region of interest in the violation video;

identifying a section of the source video which corresponds to the violation video;

registering the region of interest with a corresponding region in the source video;

determining a transfer function relating pixels in the region of interest of the violation video to pixels in the corresponding region of the source video using multiple frames of the violation video, the transfer function accounting for glare and/or shadows in the violation video not present in the source video;

determining, using the transfer function, expected values of the pixels in the region of interest of the violation video, said expected values representing an approximation of said displayed video by removing the identified glare and/or shadows introduced in said violation video;

comparing the expected values of the pixels in the region of interest to actual values of the pixels in the region of interest of the source video.

2. The method of claim 1, further comprising identifying a user associated with the violation video based on the viewing information.

3. The method of claim 1, wherein the one or more watermarks are applied to the source video by an archive server.

4. The method of claim 1, wherein at least one of the one or more watermarks is a steganographic watermark.

5. The method of claim 4, wherein the steganographic watermark comprises a watermark flashed at a frequency undetectable to a human eye.

6. The method of claim 4, wherein the steganographic watermark comprises a watermark displayed at a spatial frequency undetectable to a human eye.

7. The method of claim 1, wherein at least one of the one or more watermarks is an uneditable watermark.

8. The method of claim 7, wherein the uneditable watermark covers a significant portion of the source video.

9. The method of claim 7, wherein the uneditable watermark comprises a modification of the luminance, color, or intensity of any one color subpixel in the source video.

10. The method of claim 1, wherein the viewing information comprises one or more of the following: a time at which the source video was viewed, a device on which the source video was viewed, and the user who viewed the source video.

11. The method of claim 1, further comprising dewarping the violation video.

12. The method of claim 1, further comprising identifying irregularities in the violation video.

13. A method of extracting information from a violation video, the method comprising:

obtaining a violation video and a source video which corresponds to the violation video, said violation video being acquired by a video camera capturing a display screen displaying a displayed video, said displayed video comprising said source video combined with one or more watermarks, said violation video comprising irregularities including glare and/or shadows resulting from said capturing that are not said one or more watermarks;

identifying a region of interest in the violation video;

registering the region of interest with a corresponding region in the source video;

identifying glare and/or shadows in the region of interest of the violation video not present in the source video using multiple frames of the violation video;

determining, using the identified glare and/or shadows, expected values of the pixels in the region of interest of the violation video, said expected values representing an approximation of said displayed video by removing the identified glare and/or shadows introduced in said violation video;

comparing the expected values of the pixels in the region of interest to actual values of the pixels in the region of interest from said source video to identify features of one or more watermarks based on differences between the expected values of the pixels in the region of interest and the actual values of the pixels in the region of interest from said source video.

14. The method of claim 13, further comprising identifying features of one or more watermarks based on differences between the expected values of the pixels in the region of interest and the actual values of the pixels in the region of interest.

15. The method of claim 14, further comprising identifying a user associated with the violation video based on the identified features of the one or more watermarks.

16. The method of claim 13, wherein the source video comprises a video or a segment of a video recorded by a security camera.

17. A method of identifying a user associated with a violation video, the method comprising:

streaming a source video to a monitoring device;

applying one or more watermarks to the source video at the monitoring device, wherein the one or more watermarks identify viewing information related to the source video;

displaying a displayed video comprising the source video and the one or more watermarks to the user on the monitoring device;

retrieving the violation video, wherein the violation video is a copy of the displayed video, said violation video being acquired by a video camera capturing a display screen of the monitoring device, said violation video comprising irregularities including glare and/or shadows resulting from said capturing that are not said one or more watermarks;

identifying a section of the source video which corresponds to the violation video;

identifying a region of interest in the violation video;

registering the region of interest with a corresponding region in the source video;

identifying glare and/or shadows in the region of interest of the violation video not present in the source video using multiple frames of the violation video;

determining, using the identified glare and/or shadows, expected values of the pixels in the region of interest of the violation video, said expected values representing an approximation of said displayed video by removing the identified glare and/or shadows introduced in said violation video;

comparing the expected values of the pixels in the region of interest to actual values of the pixels in the region of interest of said source video;

identifying features of one or more of the one or more watermarks; and identifying the user based on the identified features of the one or more watermarks.

18. The method of claim 17, wherein said identifying the user based on the identified features of the watermarks comprises using a pattern between user's identifiers and said identified features.

* * * * *